United States Patent [19]

Appel

[11] Patent Number: 4,956,874

[45] Date of Patent: Sep. 11, 1990

[54] METHOD AND APPARATUS FOR PROCESSING DIGITIZED IMAGES

[75] Inventor: Jean Appel, Vanves, France

[73] Assignee: Office National d'Etudes et de Recherche Aerospatiales (ONERA), Chatillon, France

[21] Appl. No.: 164,801

[22] Filed: Mar. 7, 1988

[30] Foreign Application Priority Data

Mar. 16, 1987 [FR] France ............... 87 03573

[51] Int. Cl.$^5$ ........................... G06K 9/36
[52] U.S. Cl. ........................... 382/56; 382/68; 358/443
[58] Field of Search ............ 382/56, 68; 358/280

[56] References Cited

U.S. PATENT DOCUMENTS

| | | | |
|---|---|---|---|
| 3,987,412 | 10/1976 | Morrin | 382/56 |
| 4,288,816 | 9/1981 | Kashioka et al. | 358/138 |
| 4,365,273 | 12/1982 | Yamada et al. | 382/56 |
| 4,426,731 | 1/1984 | Edlund et al. | 382/56 |
| 4,566,128 | 1/1986 | Araki | 382/56 |
| 4,783,834 | 11/1988 | Anderson et al. | 382/56 |
| 4,791,680 | 12/1988 | Yokoe et al. | 382/56 |

OTHER PUBLICATIONS

IBM Technical Disclosure Bulletin, vol. 19, No. 3, Aug. 1976, pp. 1094-1095, New York, U.S., T. H. Morrin: Contour Coding of Black/White Images without Recursion, p. 1094, lines 1-15.

Primary Examiner—David K. Moore
Assistant Examiner—Michael Razavi
Attorney, Agent, or Firm—Kane, Dalsimer, Kurucz, Levy, Eisele and Richard

[57] ABSTRACT

Apparatus for processing digitized images, the apparatus being of the type comprising a matrix memory (104) of pixels (106) organized as N lines (108) by P columns (110), together with processing means (130) for determining which pixels (106) are in the excited state by reading the memory (104). The processing means (130) operate by determining and storing the address of an excited pixel (106) that occupies an extreme position in a line or a column position, by switching said pixel (106) to a non-excited state, and by reiterating these operations until none of the pixels (106) is excited.

9 Claims, 2 Drawing Sheets

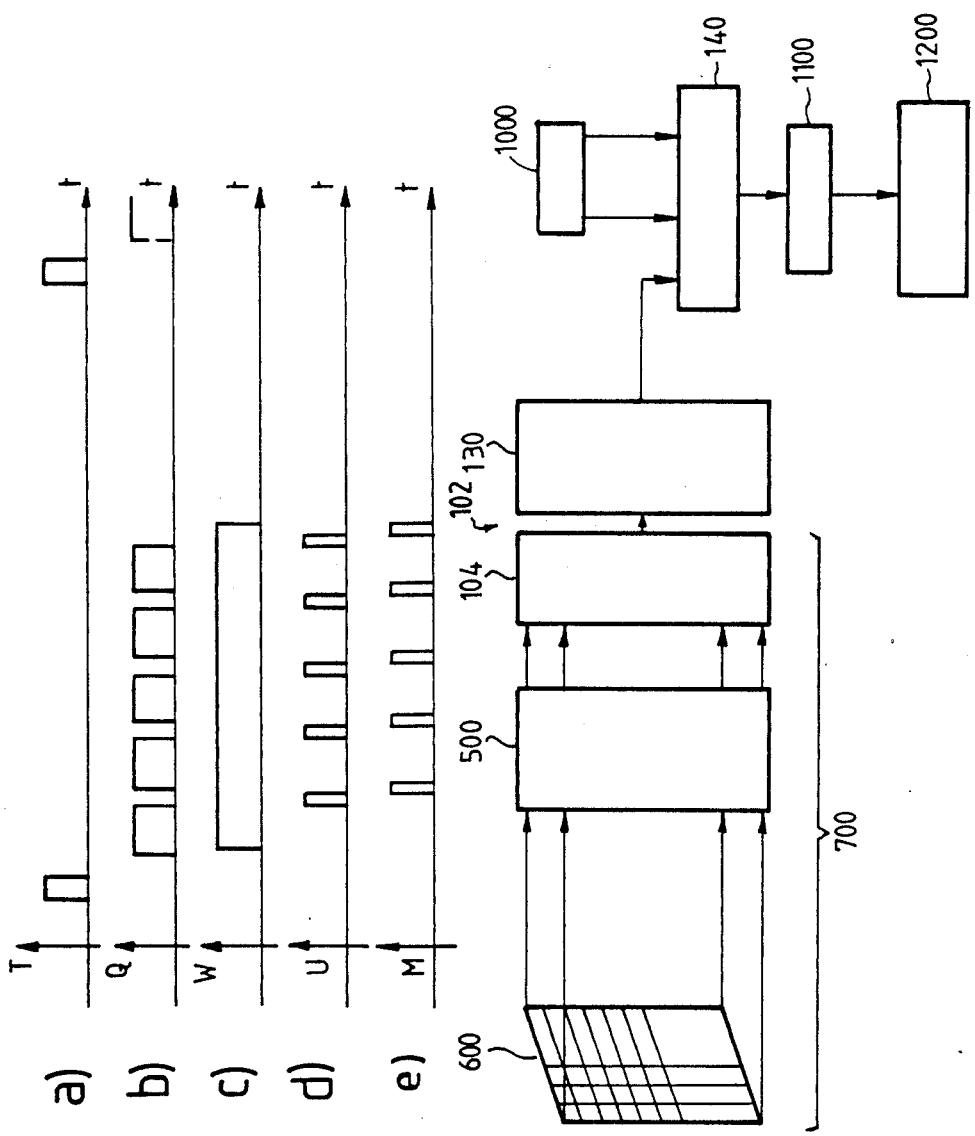

METHOD AND APPARATUS FOR PROCESSING DIGITIZED IMAGES

The present invention relates to a method of processing digitized images for the purpose, in particular, of reading them quickly and/or of compressing them. The invention applies to analyzing images which are sampled by a mosaic of photodetectors and which are stored, after being digitized, in a memory.

BACKGROUND OF THE INVENTION

In memory, an image may be defined by a matrix of pixels occupying N lines and P columns. In some cases, the sampled and digitized image is represented by a sequence of 0s and 1s disposed in lines and columns in the matrix and the proposed device then serves to directly locate memory cells that contain a 1 (or a 0).

In general, such digitized images are analyzed by reading the matrix memory sequentially and testing each pixel to determine whether it satisfies a predetermined condition. The term "excited" is used below to designate a pixel which satisfies the condition since, in general, the condition relates to whether the pixel is to be considered as being illuminated or not.

Such sequential reading necessarily leads to scanning the entire memory even if the number of excited pixels is small compared with the total number of pixels in the memory. This gives rise to a waste of time which considerably reduces the speed at which the image can be read.

The object of the invention is to provide a solution to this problem. To this end, the invention provides apparatus capable of processing only useful information, i.e. the excited pixels of a matrix memory.

SUMMARY OF THE INVENTION

The invention relates to digitized image processing apparatus of the type comprising:

a pixel matrix memory organized as N lines by P columns; and processing means for determining which pixels are in the excited state by reading the memory.

According to a general definition of the invention, the processing means operate by determining and storing the address of an excited pixel that occupies an extreme position in a line or a column, by switching said pixel to a non-excited state, and by reiterating these operations until none of the pixels is excited.

More particularly, the processing means comprise:

N priority encoders connected to the outputs of the N lines of the matrix memory and each determining, whether there exists at least one excited pixel on the associated line, together with the column address of the excited pixel on said line in the most extreme position;

an output memory suitable for storing the column addresses determined in this way for each of the lines;

N column address decoder means connected to the address outputs of the N priority encoders and suitable for controlling the changes of state of pixels occupying said extreme addresses;

control means having two alternating states serving, respectively, to cause addresses to be stored in the output memory and then to cause the states of pixels to be changed until all of the N priorty encoders indicates that none of the pixels is excited; and an additional priority encoded receiving the outputs representative of the existence of excited pixels from the N priority encoders, in order to determine whether there exists an excited pixel overall, for the benefit of the control means and also to determine the extreme line address from among the line addresses of the N priority encoders having at least one pixel in the excited state, said line address being applied to the output memory.

According to another characteristic of the invention, the apparatus comprises:

N 3-state gates whose inputs are respectively connected to the address outputs from the N priority encoders, and whose outputs are connected in common to an input of the output memory for receiving the column addresses; and an additional decoder means for decoding the line addresses and for enabling the corresponding 3-state gate.

In a preferred embodiment of apparatus of the invention, the additional line address decoder comprises N comparators respectively associated with the N column address decoder means.

In a particular aspect of the invention, each of the N column address decoders is enabled by an AND gate which simultaneously receives a signal coming from the control means, and the corresponding output from the additional line address decoder means.

The invention also provides a method of processing digitized images, the method comprising the following steps:

(a) digitized data is stored in a matrix pixel memory organized as N lines by P columns;

(b) the address of each excited pixel occupying an extreme line of column position is determined and stored, and said pixel is switched to the non-excited state, and said operations are reiterated until none of the pixels is excited; and (c) an image of the excited pixels is established from the data.

BRIEF DESCRIPTION OF THE DRAWINGS

An embodiment of the invention is described by way of example with reference to the accompanying drawings, in which:

FIG. 2 is a set of waveform diagrams for illustrating the operation of apparatus in accordance with the invention; and FIG. 3 is a diagram showing a particular application of the invention. In numerous respects the accompanying drawings include items which are definitive in native. They may therefore serve not only to elucidate the following description, but also to contribute to the definition of the invention, where appropriate.

MORE DETAILED DESCRIPTION

Figure 1:
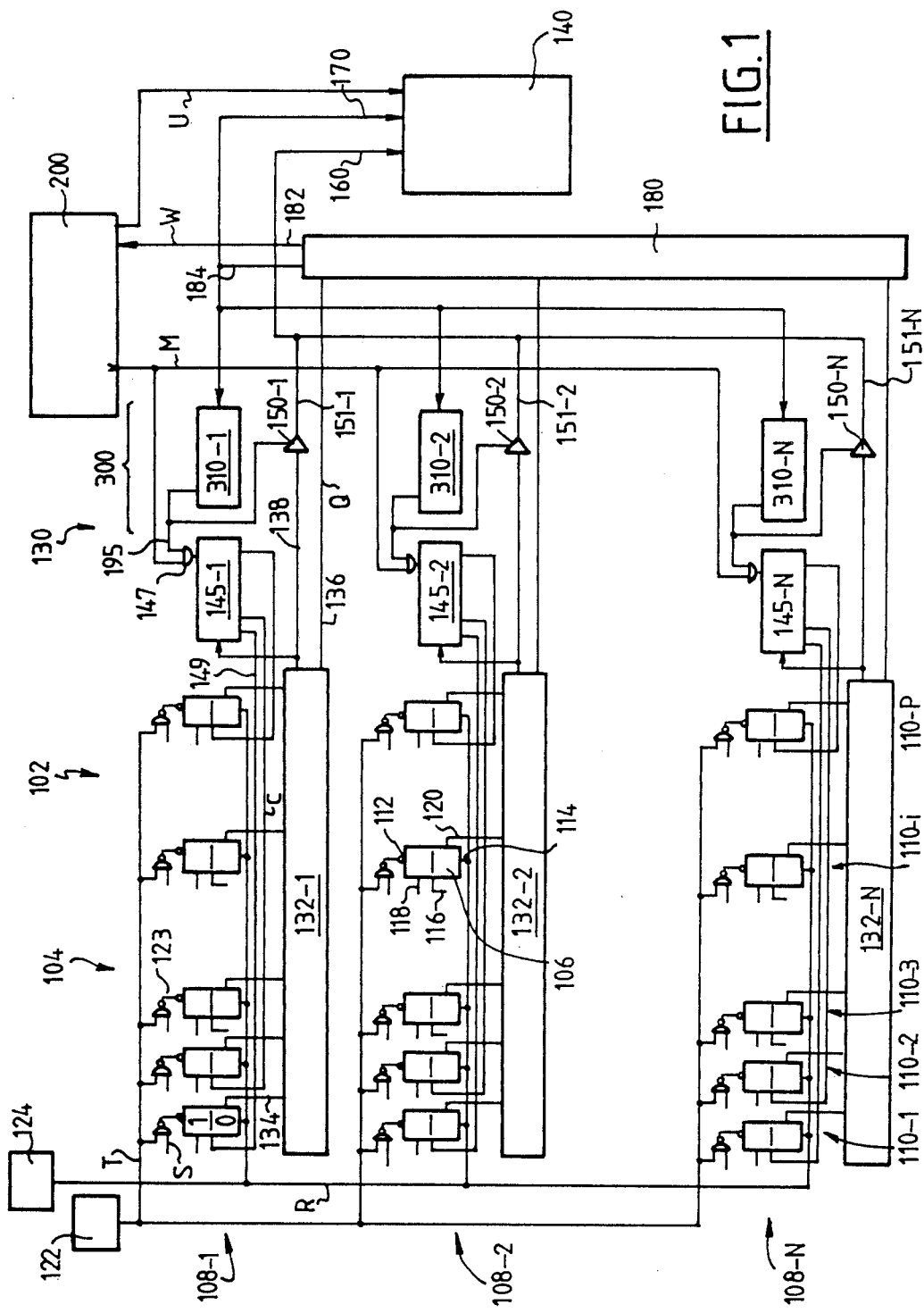
FIG. 1 is a diagram of a preferred embodiment of apparatus in accordance with the invention.

In FIG. 1, apparatus 102 in accordance with the invention comprises a matrix memory 104 of pixels 106 organized as N lines 108 given individual references 108-1, 108-2, ..., 108-N, by P columns 110 given individual references 110-1, 110-2, ..., 110-P. In order to simplify the drawing, only the lines 108-1, 108-2, and 108-N, and the columns 110-1, 110-2, 110-3, 110-I, and 110-P are shown.

Each pixel 106 is stored, in this case, in a D-type bistable component. Each of the bistables has a first input 112 for forcing the 1 state ("present" input), a second input for forcing the 0 state ("clear" input), a third input 116 for receiving a clock signal, a fourth input 118 for receiving "data", and an output 120.

An input control circuit 122 delivers an input enable signal T which is applied to NAND gates 123. The other inputs of the NAND gates 123 receive individual signals S whose logic levels are 1 or 0 depending on whether the associated pixel is excited or not.

A general clear means 124 delivers a signal R suitable for clearing the pixels 106 and is connected to each of the clear inputs 114. The inputs 114 are active when they receive a logic level 0. Consequently, the general clear operation is performed when the signal R from the means 124 is set to logic level 0.

The data inputs 118 are set to logic level 0. They are taken into account when a clock pulse is received at 116, in a manner explained below.

The apparatus 102 includes processing means 130 for determining which of the pixels 106 is in an excited state.

The processing means 130 comprise: N priority encoders 132 given individual references 132-1, 132-2, ..., 132-N; N column address decoders 145 given individual references in the same manner; an additional priority encoder 180, and an additional address decoder 300 which is advantageously constituted by N comparators 310.

Each of the priority encoders 132 comprises P inputs 134 respectively connected to the outputs 120 of the bistables 106 of the line 108 under its control. In this embodiment of the invention, the outputs 120 which are at 0 correspond to those pixels which are excited. The priority encoder indicates the number of the highest ranking one of the outputs 120 which is at logic "0" (or, in a variant, the lowest ranking 0 output). This number is the column address, in this case.

Preferably, each priority encoder 132 has a first output 136 delivering a signal Q suitable for indicating whether at least one of the pixels amongst the P pixels of the line associated therewith is excited. Its second output 138 indicates the column address of the endmost excited pixel in said line.

The N column address decoder means 145, having individual references 145-1, 145-2, ..., 145-N are connected to the second outputs 138 of the priority encoders 132.

The N outputs 138 from the priority encoders 132 are respectively applied to N 3-state gates 150 given individual references 150-1, 150-2, ..., 150-N each of which is associated with a respective one of the lines 108.

The outputs 151 of the gates 150 are connected in common to a first input 160 of the output memory 140. That one of the gates 150 which is conducting supplies digital signals representative of the column address of an excited pixel for storage in the memory 140.

The additional priority encoder 180 receives the first outputs 136 (for indicating the existence of an excited pixel) from the N priority encoders 132. This encoder is referred to as being "additional" since it operates on the lines, unlike the N encoders 132 which operate on the columns.

The additional priority encoder 180 includes a first output 182 delivering a signal W which indicates to control means 200 whether there exists any excited pixel 106 in the entire memory 104.

It also has a second output 184 connected to the second input 170 of the output memory 140. This second output 184 defines the highest line address taken from those of the N priority encoders 132 which have an active output 136, i.e. which indicate that a pixel 106 is excited. The second output 184 is also connected to an additional decoder means 300 for the line addresses, suitable for enabling the associated 3-state gate 150.

The additional line address decoder 300 comprises, in this case, N comparators 310-1 to 310-N whose digital reference values correspond respectively to the N column address decoders 145.

Each of the N column address decoders 145 is excited by an AND gate 147 which simulataneously receives a signal M coming from the control means 200 and the signal on output 195 from the associated comparator 310.

Each of the N column address decoders 145 had P outputs 149 connected to respective ones of the P clock inputs 116 of the P bistables 106 of the associated line 108.

For each decoder 145, one and only one of its outputs, as defined by the decoded input address, provides a clock signal C. This is the highest excited pixel address in the line 108 under consideration. After the clock signal C has terminated, the corresponding bistable which receives a "0" signal on its data input 118 returns to the "0" state, thereby "de-exciting" the corresponding pixel.

The processing means 130 further include control means 200 having two alternating states U and M for respectively enabling data to be stored in the output memory 140, and then for changing the state of pixels 106, until all N priority encoders 132 indicate that there are no excited pixels left.

The additional priority encoder 180 indicates the highest ranking one of the lines 136, and on line W it indicates that there exists at least one excited pixel. The indication in question is a line address which appears on link 184. That one of the comparators 310 which corresponds thereto enables the associated gate 150. The line 160 then transmits the column address of the excited pixel to the memory 140, and simultaneously its line address arrives at the memory over the link 184 and 170. During the next M state, the corresponding decoder 145 clears the excited pixel which has now been stored in 140.

The operation of the apparatus is now described in greater detail with reference to the waveform diagrams (a) to (e) of FIG. 2. For the purposes of simplification, only one line will be considered for the encoder 180, and it will be assumed that the line in question is the highest priority line.

Waveform 2a represents the signal T applied to the input 112 of the bistables 106 in order to enable said bistables to receive a new pixel state via their respective S inputs. The bistable switch on the rising edge in the signal T.

Waveform 2b represents the signal Q delivered by the output 136 of one of the priority encoders 132. This signal Q indicates whether there exists at least one excited pixel amongst the P line pixels corresponding to the priority encoder 132. The additional priority encoder 180 receives the signal Q.

Waveform 2c shows the signal W delivered by the output 182 of the additional priority encoder 180. The signal W tells the control means 200 that, overall, there exists at least one pixel which is excited. The additional priority encoder 180 determines and transmits the extreme line address taken from the line addresses of those ones of the N priority encoders 132 which indicate they have an excited pixel. This extreme line address is applied to the output memory 140 and also to the additional line address decoder means 310 for the purpose of enabling the corresponding 3-state gate 150, thereby enabling the extreme column address to be transmitted to the output memory 140.

Waveform 2d shows the signal U delivered by the control means 200 enabling the line and column addresses of the excited pixels to be stored in the output memory.

Waveform 2e shows the signal M delivered by the control means 200 so long as the signal W is present. This signal M enables the column address decoder 145 addressed by the additional line address decoder 310, which enables the signal C described with reference to FIG. 1 to cause the stored pixel to switch to the non-excited state.

So lone as the signal W is present, the operations of determining which pixels are excited and storing them in the output memory 140 are reiterated.

The apparatus of the invention thus performs the following steps:

(a) digitized data is stored in a matrix memory of pixels organized as N lines by P columns;

(b) the address of each excited pixel occupying an extreme position in a line or a column is determined and stored, and said pixel is then switched to the non-excited state, and these operations are reiterated until none of the pixels is excited.

An image based on the excited pixels only can then be established from the stored data.

The invention is applicable to analyzing images provided by an imaging system or synthesized by a computer.

FIG. 3 is a diagram showing an application of the invention to analyzing an image formed on a mosaic of individual photodetectors.

The digitized data comes from a mosaic of photoconductors 600 organized as N lines by P columns. These photoconductors 600 are activated, for example, by light radiation emitted by moving luminous objects (not shown) for which it is desired to obtain a compressed image rapidly for the purpose of determining their positions in 3 dimensions in real time.

The photoconductors 600 are coupled to an electronic analog-to-digital converter 500 which transforms the analog signals from the photoconductors into data encoded on one bit.

The converter 500 is coupled to the matrix memory 104 of pixels in accordance with the invention. The assembly of items 600, 500, and 104 constitutes a matrix optoelectronic memory 700 and thus contains a sequence of 1s and 0s arranged in lines.

The processing means 130 of the apparatus 102 of the invention reads the memory 104, determines which ones of the pixels are in an excited state, stores the excited pixels occupying an extreme line or column position in an output memory 140, then switches these pixels to the non-excited state, and reiterates these operations until non of the pixels is excited.

The output memory 140 stores the co-ordinates of the photoconductors 600 associated with the pixels via the electronic converter 500 and receives, for example, parameters 1000 relating to the moving luminous objects that are activating the photoconductors 600. These parameters may be external in origin, or else they may be determined by tracking the objects themselves using a computer 1100 mentioned below.

The parameters 1000 are, for example, the speeds of the moving objects and the distances between said objects and the photoconductors 600.

The co-ordinates of the photoconductors associated with the excited pixels and the parameters relating to the luminous objects are transmitted to a computer 1100 which can thus process the compressed images representative of the moving luminous objects, and display them on a display console 1200.

It may be observed that the way in which the photoconductors 600 associated with the pixels 104 are read depends on the wiring between the matrix memory 104 and the processing means 130. It is therefore possible to privilege a particular direction or zone when reading the photoconductors 600 as a function of the probability of the moving luminous objects appearing therein.

The present invention has numerous advantages:

the essential component parts of apparatus in accordance with the invention are simple and easy to implement;

the system operates on the basis of combinatory logic which enables a high degree of operating reliability to be obtained;

the apparatus described with reference to FIG. 1 can be used with large-size images since the circuits used can be cascaded;

the essential component parts of the apparatus in accordance with the invention can be mass-produced in the form of integrated circuits; and the compression of digital data had numerous applications, in particular in radar or sonar.

I claim:

1. Apparatus for processing digitized images comprising:

a matrix memory of pixels having N number of lines by P number of columns where N and P are integer values; and processing means for determining which pixels are in the excited state and for storing the address of said excited pixels occupying an extreme position in a line or a column and by switching said pixel to a non-excited state, and by reiterating these operations until none of the pixels is excited; and an output memory adapted to store the addresses of said excited pixels received from said processing means.

2. Apparatus according to claim 1, wherein said processing means comprise:

N priority encoders connected to the outputs of the N lines of the matrix memory and each determining, whether there exists at least one excited pixel on the associated line, together with the column address of the excited pixel on said line in the most extreme position;

an output memory suitable for storing the column addresses determined in this way for each of the lines;

N column address decoder means connected to the address outputs of the N priority encoders and suitable for controlling the changes of state of pixels occupying said extreme addresses;

control means having two alternating states U and M serving, respectively, to cause addresses to be stored in the output memory and then to cause the states of pixels to be changed until all of the N priority encoders indicates that none of the pixels is excited; and an additional priority encoder receiving the outputs representative of the existence of excited pixels from the N priority encoders, in order to determine whether there exists an excited pixel overall, for the benefit of the control means and also to determine the extreme line address from among the line addresses of the N priority encoders having at least one pixel in the excited state, said line address being applied to the output memory.

3. Apparatus according to claim 2, further including:
N 3-state gates whose inputs are respectively connected to the address outputs from the N priority encoders, and whose outputs are connected in common to an input of the output memory for receiving the column addressed; and
an additional decoder means for decoding the line addresses and for enabling the corresponding 3-state gate.

4. Apparatus according to claim 3, wherein the additional line address decoder means comprises N comparators respectively associated with the N column address decoder means.

5. Apparatus according to claim 3, wherein each of the N column address decoders is enabled by an AND gate simultaneously receiving a signal M coming from the control means and the corresponding output from the additional line address decoder means.

6. Apparatus according to claim 1, wherein the pixels are embodied by bistable components whose excited state is under the control of generator means, and whose non-excited state is under the control of overall clear means.

7. Apparatus according to claim 6, wherein the bistable components are D-type bistables.

8. Apparatus according to claim 1, wherein the digitized images are supplied by an optoelectronic memory constituted by a mosaic of photodetectors and an analog-to-digital converter which transforms the analog signals sampled by the photodetectors into digitized pixels which are stored in the matrix memory.

9. A method of processing digitized images, the method comprising the following steps:
(a) digitized data is stored in a matrix pixel memory having N number of line by P number of columns where N and P are integer values;
(b) the address of the excited pixels occupying an extreme position in a line or a column, are determined and stored;
(c) among said pixels, the address of each excited pixel occupying an extreme position in a line or a column position is determined and stored in an output memory, and said pixel is switched to the non-excited state, and said operations are reiterated until none of the pixels is excited; and
(d) an image of the excited pixels is established from the data.

* * * * *